Sept. 1, 1931.   W. L. PAUL   1,821,073
TRACTOR
Filed Nov. 6, 1926
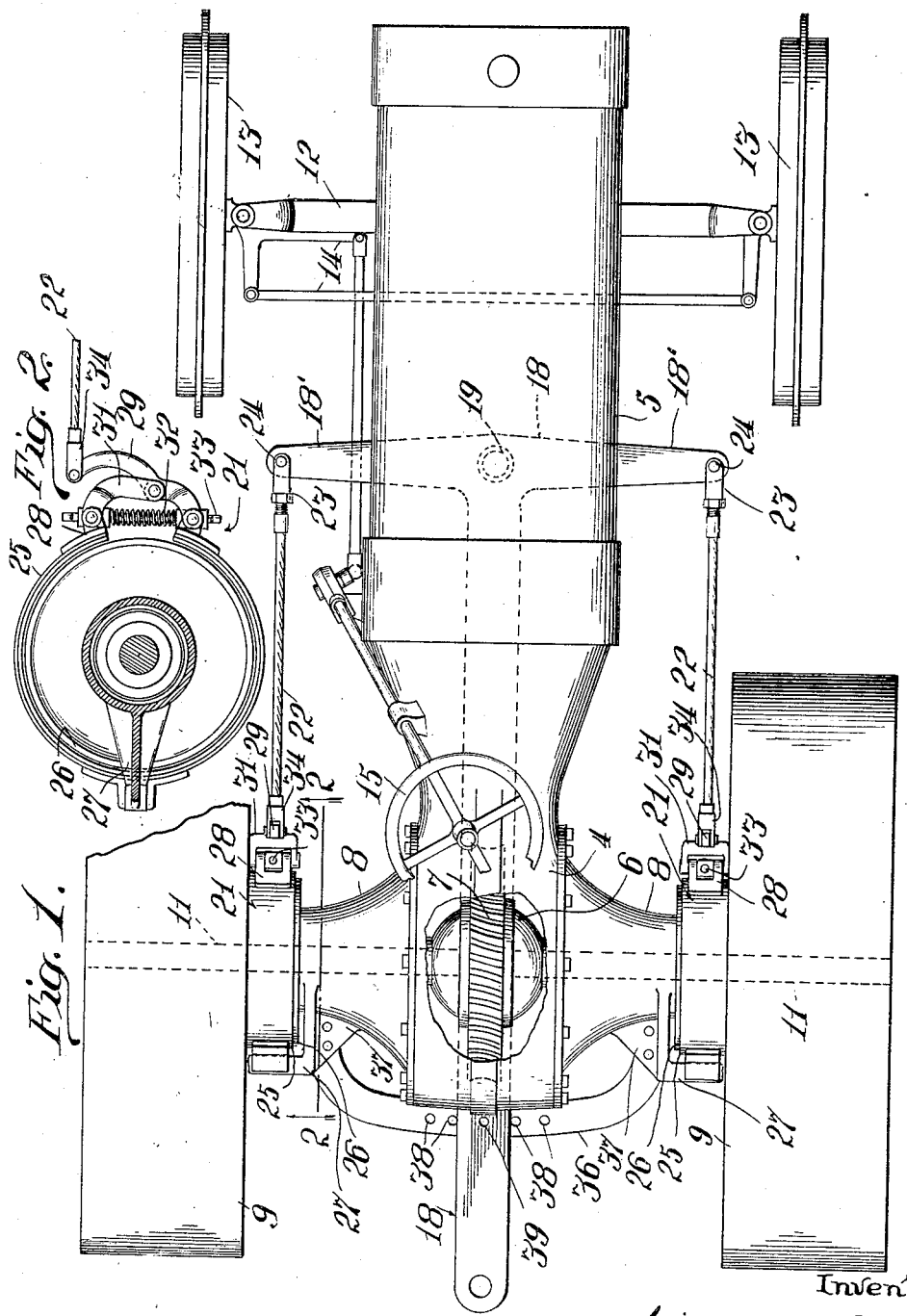
Witness
Milton Lenoir
Inventor
William L. Paul,
By John L. Jackson.
Attorney Patented Sept. 1, 1931

1,821,073

UNITED STATES PATENT OFFICE

WILLIAM L. PAUL, OF BERKELEY, CALIFORNIA, ASSIGNOR TO DEERE & COMPANY, OF MOLINE, ILLINOIS, A CORPORATION OF ILLINOIS

TRACTOR

Application filed November 6, 1926. Serial No. 146,586.

The present invention relates to tractors and has special reference to improved mechanism embodied in the tractor and designed to facilitate the steering or turning of the tractor, particularly under load.

In tractors generally, and particularly in the case of farm tractors when plowing or operating under other heavy load conditions, great difficulty is often had in steering the tractor around a short turn. The conventional draft hitch, ordinarily employed on tractors, results in the line of draft being applied to the tractor at a point where the draft load has the action of resisting turning of the tractor, particularly through short turns. In consequence, the front end of the tractor must "fight" its way around the turn, imposing heavy stresses on the steering wheels and steering linkage, and in many instances causing the front steering wheels to slip laterally over the surface of the ground, even when equipped with the customary guide flanges designed to prevent this side slipping.

It is the fundamental object of the present invention to avoid these difficulties by providing means which is effective upon a change in the line of travel to retard the rate of travel of the inner side of the tractor and to accelerate the rate of travel of the outer side of the tractor, thereby facilitating the action of the steering wheels through a steering effort given the traction elements of the tractor. More specifically, this improved means assists the steering action of the vehicle by steering through the differential. In contradistinction to the majority of prior devices which have steered through the differential, the present mechanism makes this steering control responsive only to the angle of the line of draft and to the resistance of the draft load. Thus, if the tractor has no load hitched thereto, but is travelling free, no differential steering action occurs, but all of the steering results entirely from the directing action of the front wheels, which is desirable at such times. On the other hand, when the tractor is travelling under load, the amount of differential steering which occurs to assist the front wheel steering is dependent upon the sharpness of the turn and the resistance of the draft load, which characteristics are of advantage, as will presently appear.

Referring to the accompanying drawings illustrating a preferred adaptation of my invention:

Figure 1 is a plan view of a typical design of tractor embodying the invention, and Fig. 2 is a detail sectional view of one of the brake bands, taken on the plane of the line 2—2 of Figure 1.

In its broadest aspect, the invention has application either to a bull wheel or to an endless tread type of tractor, the former adaptation representing the one of greatest advantage, however, and being the embodiment shown in the drawings. The exemplary design of tractor shown is representative of a well known make wherein the front and rear axles are connected by a unit power plant assembly which serves as the frame of the vehicle. This power plant comprises the usual internal combustion engine, clutch, transmission and differential, the latter mechanisms being contained in a housing indicated at 4. The engine is obscured by the fuel tank 5 which extends across the top thereof. The upper portion of the rear housing 4 has been broken away in the illustration to show the differential 6. In the type of tractor illustrated, this differential is driven through a worm drive, the ring gear 7 of the differential being a worm wheel. Axle housings 8—8 extend laterally from the differential housing 4 to support the two bull wheels 9. Axle sections 11 extend from the differential 6 to these bull wheels for driving the same. The front axle 12 supports front steering wheels 13 suitably connected through steering linkage 14 and arranged to be steered through a steering wheel 15. The foregoing is merely descriptive of a conventional type of tractor to which my invention has application, it being understood, however, that in its broader scope the invention has application to any dirigible type of pulling vehicle wherein the aforesaid steering difficulties arise.

Referring now to the construction and arrangement of the invention, the tractor is provided with a draft attachment in the form of a T-shaped draw bar 18, which is pivoted to the tractor at 19. This pivotal attachment may be made to the underside of the engine or to any suitable frame structure comprising a part of a vehicle. The laterally extending arms 18′ of this draw bar have operative connection with suitable brake devices 21 associated with each driving wheel 9. Preferably this operative connection is established through cables 22 which connect to the ends of the laterally projecting arms 18′ and extend back to the brake devices. The cables are connected to the arms 18′ by clevises or like connecting members 23 which pivotally attach to the arms 18′ on pivot pins 24.

The brake devices may be of any desired construction, but preferably they consist of contractible brake bands engaging over brake drums, as shown in Figure 2. Each brake band 25 encircles a brake drum 26 which is secured to the adjacent driving wheel 9 to rotate therewith. The bands are held against rotation by suitable attachment to arms 27 extending back from the rear axle housing sections 8. The free ends of the bands carry the usual pivot lugs 28, and to the lugs of each band is connected any typical brake operating linkage, such as the lever 29 and link 31. A separating spring 32 is generally interposed between the ends of the brake band on a rod 33 extending between the pivot lugs. The rear ends of the cables 22 connect to the brake operating levers 29 by clevises or like connecting members 34. The clevises 23 or 34 may be provided with suitable threaded bushings or thimbles screwing into and out of the same to provide an adjustment for increasing or decreasing the effective length of each cable.

The lateral swinging movement of the draw bar 18 is guided at the rear on a transversely extending arcuate supporting bar 36 which is preferably disposed below and slightly in rear of the differential housing 4. The ends of this supporting bar are suitably secured to the axle housing, such as to webs 37 which reinforce the brake supporting arms 27. Such supporting bar may be provided with one or more holes 38 to receive a bolt or coupling pin dropped down through an opening 39 in the draw bar for rigidly holding the latter against pivotal movement when backing the tractor and load.

In the operation of the present mechanism, the swinging draw bar 18 will tend to aline itself at all times with the line of draft between the tractor and the plow or other implement constituting the draft load. When the line of draft is straight ahead the draw bar will maintain a central position, at which time no braking retardation will be exerted on either drive wheel. However, when the tractor is steered either right or left through the front steering wheels 13, the draw bar will swing inwardly towards that side in accordance with the changing line of draft. This will result in the cable 22 on the inner side of the tractor pulling up on its brake band, while slack is given the other cable. Thereupon the driving wheel or traction element 9 on the inner side of the turn will be frictionally retarded through the engaging of its brake 21, followed by an accelerated rate of travel being transmitted to the outer traction element through the action of the differential 6. As the result of the differential speeds of these driving elements the driving energy of the tractor becomes effective for assisting the front steering wheels in their steering function, and the characteristics of a power steered vehicle are obtained. The differential steering, while not controlling the angle of turn of the tractor, supplements the action of the front steering wheels and prevents the draft load from causing the steering wheels to slip laterally over the ground.

It will be evident that in this differential steering, the braking retardation exerted on the inner wheel will be proportional to the deflected angle of the draw bar and to the resistance of the load. By virtue of this, the power steering set up between the driving wheels is automatically proportioned to the requirements of each turn and to the draft load. Thus, when moving through a very gradual turn, where front wheel steering is adequate, the braking action on the inner wheel is very slight; but with sharper angles where the front wheels might tend to slip sideways, the braking action comes into play in proportion to the shortness of the turn. The intensity of this braking action can be adjusted in proportion to the angle of the draw bar by adjusting the effective lengths of the cables 22. When pulling a light load, where front wheel steering is adequate, the braking action on the inner wheel will also be relatively light; but with heavier loads the braking action increases in proportion owing to the greater force exerted through the draw bar, which action is desirable to the end of preventing side slipping of the steering wheels.

If it should be desired to maintain the line of draft at an angle to the tractor, as might be true in plowing or cultivating, the cables 22 may be adjusted so that neither brake will be engaging with its brake band when the draw bar is at the desired draft angle. Such adjustment does not sacrifice the advantages of the present power steering, however, inasmuch as deviation of the draw bar to either side of this predetermined draft angle, incident to making a turn, will result in the same differential steering above described. For maintaining a side hitch, without differential steering, the draw bar may be rigidly coupled to the cross supporting bar 36 by passing a coupling pin through the hole in the draw bar and through one of the lateral holes in the cross bar. When it is necessary to back the load through the draw bar, the latter can be held against swinging movement by dropping the coupling pin through the draw bar and through the central hole in the cross bar 36.

It will be observed that I have illustrated the pivotal center 19 of the draw bar as being located considerably forward of the rear axle. This point of location is of advantage for facilitating the steering of the tractor, as it tends to balance the action of the draft load between the front and rear wheels, but such location of this pivotal center is not of the essence of the invention as the draw bar can be pivoted to the tractor at practically any desired point, in closer proximity to the rear axle, or in rear of the latter, while still maintaining the differential steering action above described.

What I claim as my invention and desire to secure by Letters Patent, is—

1. In a tractor, the combination of steering wheels, power driven traction elements, a differential operatively connected to said traction elements, a swinging draw bar, brake devices adapted to retard said traction elements, and means operatively connecting said draw bar to said brake devices to brake the traction element on the side to which the tractor is turned.

2. A tractor comprising front steering wheels, power driven rear wheels, a differential operatively connecting said rear wheels and through which power is transmitted thereto, separate brake drums rotating with each of said rear wheels, brake bands cooperating with said brake drums, a T-shaped draw bar pivoted to said tractor, and operating means connected between the cross arms of said draw bar and said brake bands.

3. A tractor comprising front steering wheels, power driven rear wheels, a differential operatively connected to both of said rear wheels and through which power is transmitted thereto, brake drums mounted coaxially with said rear wheels and connected thereto, brake bands encircling said brake drums, a T-shaped draw bar pivoted to said tractor, and cables extending between the laterally projecting arms of said draw bar and said brake bands for operating the latter.

4. A tractor comprising the combination of power driven traction elements, a draw bar, and means actuated by swinging of the draw bar for establishing a power-steering energy between said traction elements so that the tractive effort on the side opposite the direction of turning is increased.

5. A tractor adapted to move an attached load and comprising at least two power driven traction elements, movably mounted draft means adapted to be displaced laterally in accordance with lateral deflection of the line of draft between the tractor and vehicle, and means made operative by the movement of said draft means for diverting a greater proportion of power to the traction element on the side of the tractor opposite the side to which the tractor is turned for establishing a power-steering energy between said traction elements.

6. A traction vehicle adapted to move an attached trailing load, means connecting the load to the rear of the vehicle comprising a swinging draw bar, traction means including two power driven traction elements, steering means for performing the entire steering function for the vehicle when the latter is traveling without load, and secondary steering means controlled by said swinging draw bar and automatically operable by the pull of the load on the draw bar to divert a greater proportion of power to the traction element on the side of the tractor opposite to which it is being turned to assist said first named steering means in turning.

WILLIAM L. PAUL.